US012590009B2

(12) United States Patent　　　(10) Patent No.:　US 12,590,009 B2
M Noh et al.　　　　　　　　　　(45) Date of Patent:　　Mar. 31, 2026

(54) REACTOR AND METHOD FOR MAKING CALCIUM HYDROXIDE

(71) Applicant: PETROLIAM NASIONAL BERHAD (PETRONAS), Kuala Lumpur (MY)

(72) Inventors: Mohammad Ghaddaffi b M Noh, Kuala Lumpur (MY); M Syazwan B Onn, Kuala Lumpur (MY); Ruzilah Binti Sanom, Kuala Lumpur (MY)

(73) Assignee: PETROLIAM NASIONAL BERHAD (PETRONAS), Kuala Lumpur (MY)

( * ) Notice: Subject to any disclaimer, the term of this patent is extended or adjusted under 35 U.S.C. 154(b) by 1062 days.

(21) Appl. No.: 17/626,024

(22) PCT Filed: Jul. 8, 2020

(86) PCT No.: PCT/MY2020/050050
§ 371 (c)(1),
(2) Date: Jan. 10, 2022

(87) PCT Pub. No.: WO2021/006722

PCT Pub. Date: Jan. 14, 2021

(65) Prior Publication Data

US 2022/0250930 A1　　Aug. 11, 2022

(30) Foreign Application Priority Data

Jul. 11, 2019　(MY) ............................ PI2019004019

(51) Int. Cl.
C01F 11/18　　　(2006.01)
B01J 3/00　　　　(2006.01)
(Continued)

(52) U.S. Cl.
CPC ............. C01F 11/181 (2013.01); B01J 3/008 (2013.01); B01J 19/0066 (2013.01);
(Continued)

(58) Field of Classification Search
None
See application file for complete search history.

(56) References Cited

U.S. PATENT DOCUMENTS 4,779,992　A　　10/1988　Underwood
2004/0013596　A1　　1/2004　Fouche et al.

FOREIGN PATENT DOCUMENTS

JP　　　H06296979　A　　10/1994
JP　　　2007254220　A　　10/2007

OTHER PUBLICATIONS

Machine translation of Funahashi et al., JP H06296979A (Funahashi) (Year: 1994).*

(Continued)

*Primary Examiner* — Keling Zhang
(74) *Attorney, Agent, or Firm* — Harness, Dickey & Pierce, P.L.C.

(57)　　　　　　ABSTRACT

A method for making a calcium hydroxide solution includes adding water and calcium oxide into a slaking reactor equipped with a stirring means at an upper end and two or more outlets positioned at different heights. The materials are stirred so that a vertical concentration gradient of calcium ions develops within the reactor, producing a clear liquid layer at an upper region and a milk of lime suspension at a lower region. A desired calcium hydroxide solution is obtained by selecting an outlet corresponding to the required concentration of calcium ions.

8 Claims, 5 Drawing Sheets

(51) Int. Cl.
    B01J 19/00          (2006.01)
    B01J 19/18          (2006.01)
    B01J 19/26          (2006.01)
    C01F 11/02          (2006.01)

(52) U.S. Cl.
    CPC ........... B01J 19/1875 (2013.01); B01J 19/26
        (2013.01); C01F 11/02 (2013.01); *B01J*
        *2219/00162* (2013.01); *B01J 2219/00164*
        (2013.01); *B01J 2219/00182* (2013.01); *C01P*
        *2004/61* (2013.01); *C01P 2004/62* (2013.01)

(56)            References Cited

OTHER PUBLICATIONS

Feng, Bo et al., Effect of various factors on the particle size of calcium carbonate formed in a precipitation process, Materials Science and Engineering A, 2007, vol. 445-446, pp. 170-179 (Available online: Oct. 9, 2006).
International Search Report and Written Opinion of the International Searching Authority issued in PCT/MY2020/050050, mailed Nov. 6, 2020; ISA/KR.

* cited by examiner

Figure 4

REACTOR AND METHOD FOR MAKING CALCIUM HYDROXIDE

CROSS REFERENCE TO RELATED APPLICATIONS

This application is a U.S. National Phase Application under 35 U.S.C. 371 of International Application No. PCT/MY2020/50050 filed on Jul. 8, 2020, which claims the benefit of priority from Malaysian Patent Application No. PI2019004019 filed on Jul. 11, 2019. The entire disclosures of both of the above applications are incorporated herein by reference.

FIELD OF INVENTION

The invention relates to a reactor and method for making calcium hydroxide, in particular by use in a carbonation process.

BACKGROUND

Carbon dioxide emissions due to the burning of fossil fuels is one of the leading sources of global warming. Therefore reducing the amount of carbon dioxide released into the atmosphere through carbon sequestration can help with this problem.

A conventional method for sequestering carbon is the process of mineral carbonation, the most common of which is where carbon dioxide gas is bubbled through an aqueous solution of calcium hydroxide in a reactor to form solid particles of calcium carbonate, a reaction which can be represented as follows:

$$Ca(OH)_2 + CO_2 \rightarrow CaCO_3 + H_2O$$

Thus it will be appreciated that in addition to carbon dioxide, a source of calcium hydroxide is required to fuel the above process. Traditionally, calcium oxide (quicklime) is stirred in a 10 Brix sucrose solution, then filtered to remove the undissolved calcium oxide to create a feedstock solution of calcium hydroxide in sucrose. However, while the sucrose advantageously increases the solubility of the calcium oxide, there is a problem in that after a while it starts fermenting which can disrupt the subsequent processes.

An aim of the invention therefore is to provide a method for making calcium hydroxide which overcomes the above issues.

SUMMARY OF INVENTION

In an aspect of the invention, there is provided a method for making a calcium hydroxide solution comprising the steps of:

adding water and calcium oxide to a slaking reactor comprising stirring means at an upper end thereof, and one or more outlets;

stirring the water and calcium oxide such that a concentration gradient of calcium ions can be formed within the reactor;

selecting an outlet to collect the resultant calcium hydroxide solution depending on the concentration of calcium ions required.

Thus the desired calcium ion concentration for the carbonation process can be selected. Advantageously sucrose is not required, and capital expenditure is reduced as there is no need for a filtration system.

In one embodiment the speed of the stirring means can be selectively controlled, typically ranging from 100 rpm to 1000 rpm. With fast stirring, the solution becomes more homogenous, whereas if the solution is stirred slowly the solution is heterogenous in that a concentration gradient of calcium ions is formed.

In one embodiment two or more outlets are provided at different vertical positions of the slaking reactor. Thus a solution with a low concentration of calcium ions can be collected from the upper outlet, and a solution with a higher concentration of calcium ions can be collected from the lower outlet.

In an alternative embodiment the reactor can be provided with an outlet which can be slid vertically to allow selection of the solution with the desired calcium ion concentration.

In one embodiment the solution is sprayed into a carbonation reactor containing supercritical carbon dioxide to form a slurry of calcium carbonate. Typically the calcium carbonate is collected from the bottom of the carbonation reactor.

Advantageously calcium carbonate is formed almost instantly as a precipitate when the solution of calcium ions is sprayed into the supercritical carbon dioxide. This is because the supercritical state of the carbon dioxide allows the interfacial surface area with the calcium solution to be significantly increased, and the spray of fine droplets increases the contact area of the carbon dioxide to dissolve and react with calcium ions. The size of the calcium carbonate particles depends on a number of factors, including the concentration of calcium ions in the solution. Thus the particle size can be selectively varied by adjusting the conditions of the slaking reactor.

In one embodiment the solution is stirred slowly to provide a 'clear top' solution at an upper outlet of the slaking reactor, such that when sprayed into the carbonation reactor, calcium carbonate is formed with a particle size of around 2-10 μm.

In one embodiment the 'clear top' solution is diluted with water by 10-30% such that the calcium carbonate is formed with a particle size of around 300-600 nm.

In one embodiment the solution is stirred slowly to provide a 'milk of lime' solution at a lower outlet, or stirred quickly to provide a substantially homogenous 'milk of lime' solution in the slaking reactor, such that when sprayed into the carbonation reactor, calcium carbonate is formed with a particle size of around 10-30 μm.

In one embodiment the flow rate of the solution into the carbonation reactor is adjustable and inversely proportional to the particle size. Typically the flow rate ranges from 0.5 L/min to 1.5 L/min.

In one embodiment the solution is provided to the carbonation reactor continuously.

In one embodiment the top section of the carbonation reactor is provided with an injector nozzle for spraying the calcium hydroxide, typically with a working pressure of around 10 bar to around 400 bar. Pressures in the lower end of the range e.g. 10-50 bar can be used to make nanoparticles.

In one embodiment the injector nozzle extends around 30-40% into the reactor, typically around 35%. Thus for a 42 cm reactor, the nozzle extends about 15 cm downwardly thereinto.

In one embodiment the bottom section of the reactor is provided with an outlet with a back pressure regulator.

In one embodiment the regulator is adjusted such that the slurry continuously flows out of the reactor via the outlet while maintaining a predetermined height of slurry within the reactor.

In one embodiment the slurry column height is about 10% of the reactor height. However, it will be appreciated that the slurry column height may be adjusted by adjusting the back pressure regulator setting, to provide varying liquid retention time in the reactor. The increase of backpressure regulator opening pressure will proportionately increase the slurry column height, thus increasing the slurry liquid retention time. By varying the slurry retention time at the bottom of the reactor, the average particle size distribution of the precipitated calcium carbonate crystals may be varied accordingly Advantageously the slurry forms a barrier to prevent supercritical carbon dioxide from leaking from the reactor. In addition, the continuous flow ensures that any shut down time is minimised.

In a further aspect of the invention there is provided a system for sequestering carbon comprising:

a slaking reactor comprising stirring means at an upper end thereof for forming a concentration gradient of calcium ions within the slaking reactor when water and calcium oxide are added thereto;

a carbonation reactor for receiving a solution from an outlet of the slaking reactor;

the carbonation reactor comprising means for introducing supercritical carbon dioxide thereinto and an injector nozzle for spraying the solution thereinto; and wherein the concentration of calcium ions at an outlet of the slaking reactor can be selectively controlled to determine the particle size of calcium carbonate produced by the carbonation reactor.

In one embodiment the carbonation reactor comprises an outlet with a back pressure regulator at the bottom of the reaction chamber;

wherein the regulator is adjustable such that a slurry can continuously flow out of the reactor via the outlet while maintaining a predetermined height of slurry within the reactor.

In a further aspect of the invention there is provided a slaking reactor as herein described.

In a yet further aspect of the invention there is provided calcium carbonate made according to the method herein described.

BRIEF DESCRIPTION OF DRAWINGS

It will be convenient to further describe the present invention with respect to the accompanying drawings that illustrate possible arrangements of the invention. Other arrangements of the invention are possible, and consequently the particularity of the accompanying drawings is not to be understood as superseding the generality of the preceding description of the invention.

FIG. 4 illustrates an analysis of the slaking reaction under different conditions.

DETAILED DESCRIPTION

Figure 1:
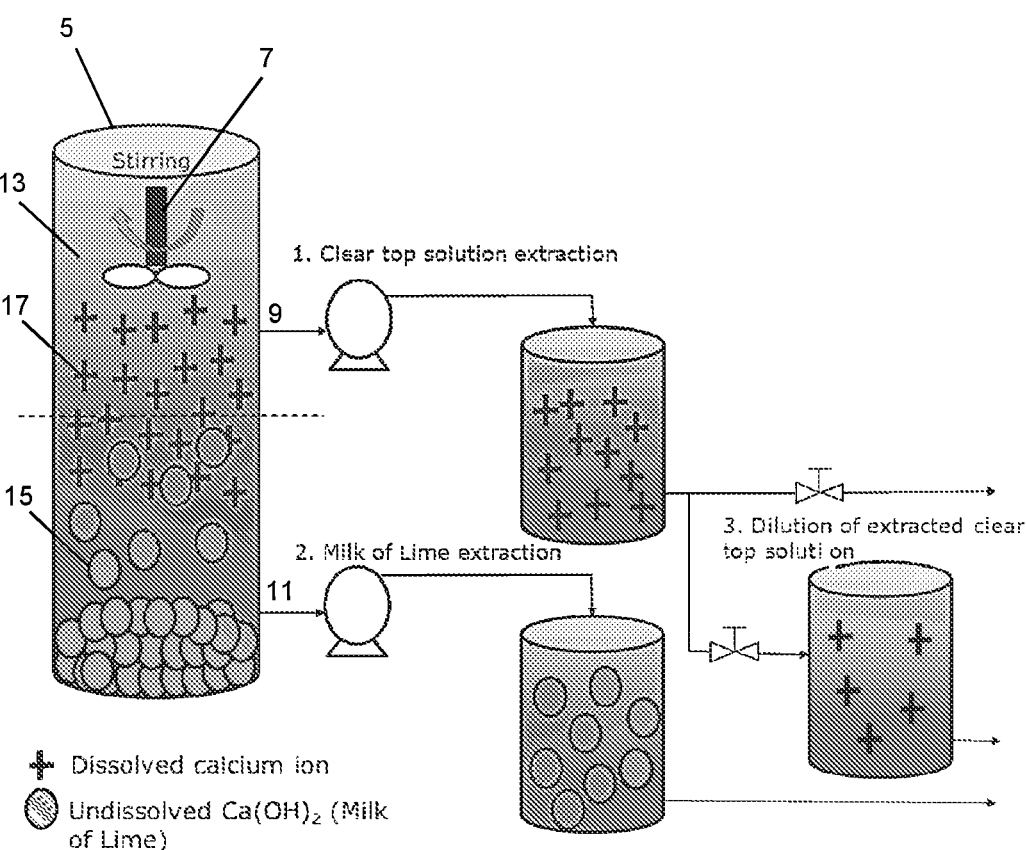
FIG. 1 is a schematic diagram of the slaking reactor according to an embodiment of the invention.

With regard to FIG. 1, a slaking reactor 5 is provided with stirring mean 7 at the upper end thereof. The slaking reactor has at least two outlets, for example an upper outlet 9 and a lower outlet 11. Water 13 and calcium oxide 15 is added to the slaking reactor, and then stirred such that the calcium oxide dissolves to form a calcium hydroxide solution.

Under slow stirring conditions, the calcium ions form a gradient, being low concentration at the top of the reactor and high concentration at the bottom. Thus at the upper outlet 8 a clear top solution 1 can be collected, whereas at the lower outlet a milk of lime solution 2 can be collected. The clear top solution may be mixed with water for form a diluted clear top solution 3. The different solutions of calcium hydroxide may then be provided to a carbonation reaction.

Figure 2:
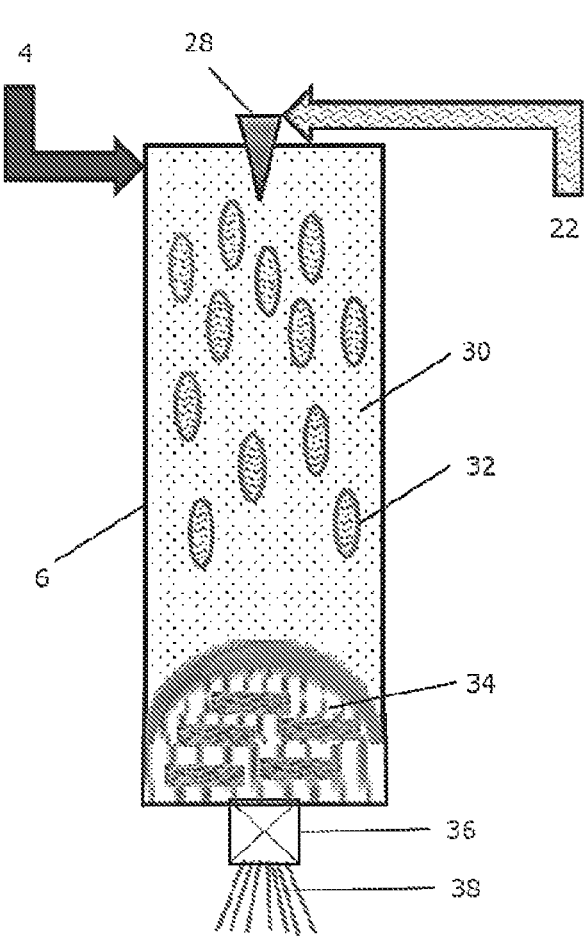
FIG. 2 is a schematic diagram of the carbonation reactor.

With reference to FIG. 2, supercritical carbon dioxide is pumped by a low compression ratio pump 4 into a carbonation reactor 6 in a supercritical condition under high pressure (e.g. 80 bar, 30° C.; although it will be appreciated that pressure down to around 10 bar would also be acceptable). The selected calcium hydroxide solution is directed to the top of the carbonation reactor 6 via pump 22, then injected in the form of atomised droplets via nozzle 28 into excess supercritical carbon dioxide 30, where it precipitates as calcium carbonate 32 almost instantaneously. The calcium carbonate falls to the bottom of the reactor 6 and forms a slurry 34 which builds up and prevents egress of carbon dioxide through the regulator 36. However, as the injection of calcium hydroxide increases the reactor pressure, the slurry is eventually forced out of the reactor 6 via the regulator 36, which can be adjusted to suit the pressure and slurry flow i.e. while maintaining a sufficient height of slurry to substantially prevent the carbon dioxide from escaping. For example, in a cylindrical reactor 10 m high and 2 m in diameter, a slurry height of around 1.5 m may be maintained to prevent escape of carbon dioxide through the regulator. The wet precipitate 38 can then be processed further without having to disrupt the continuous flow operation of the reactor.

Figure 3A:
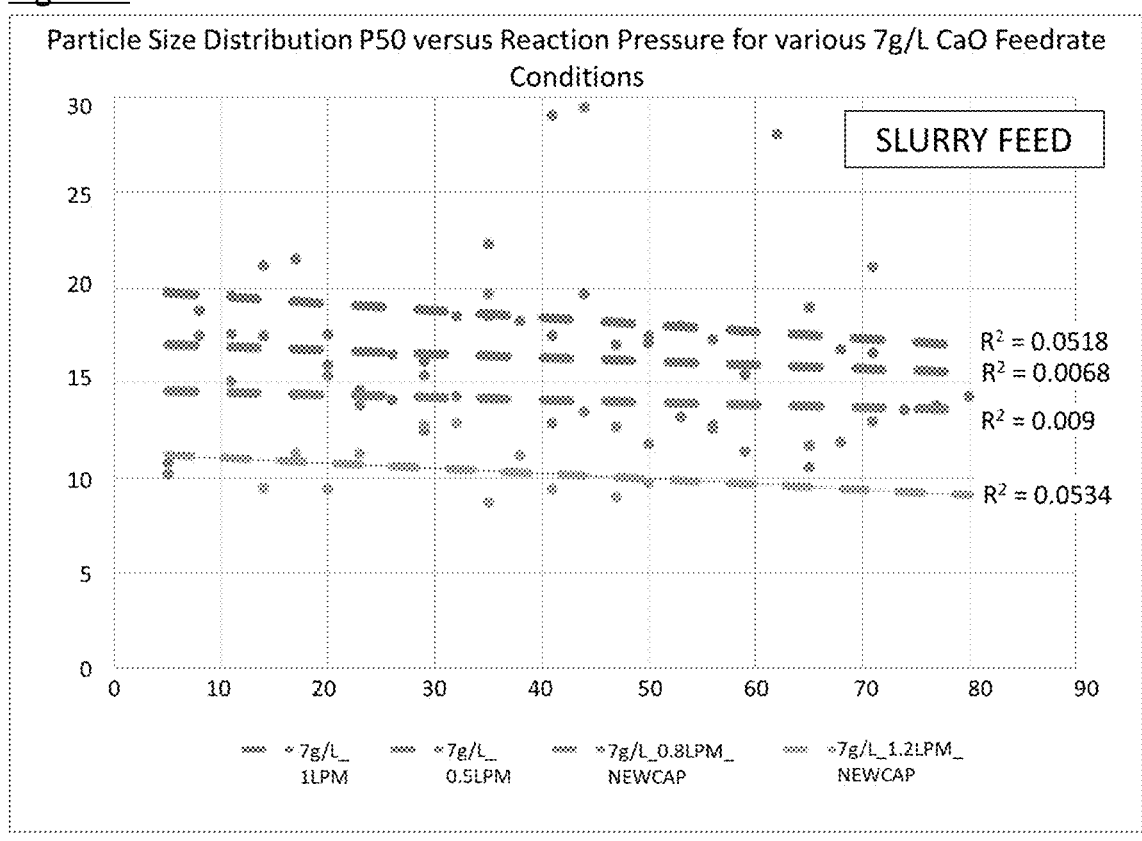
FIG. 3 is a chart indicating the particle size distribution from the carbonation reactor depending on the output from the slaking reactor (a) lower output or slurry feed; (b) clear top solution feed; (c) diluted clear top solution feed.
Figure 3B:
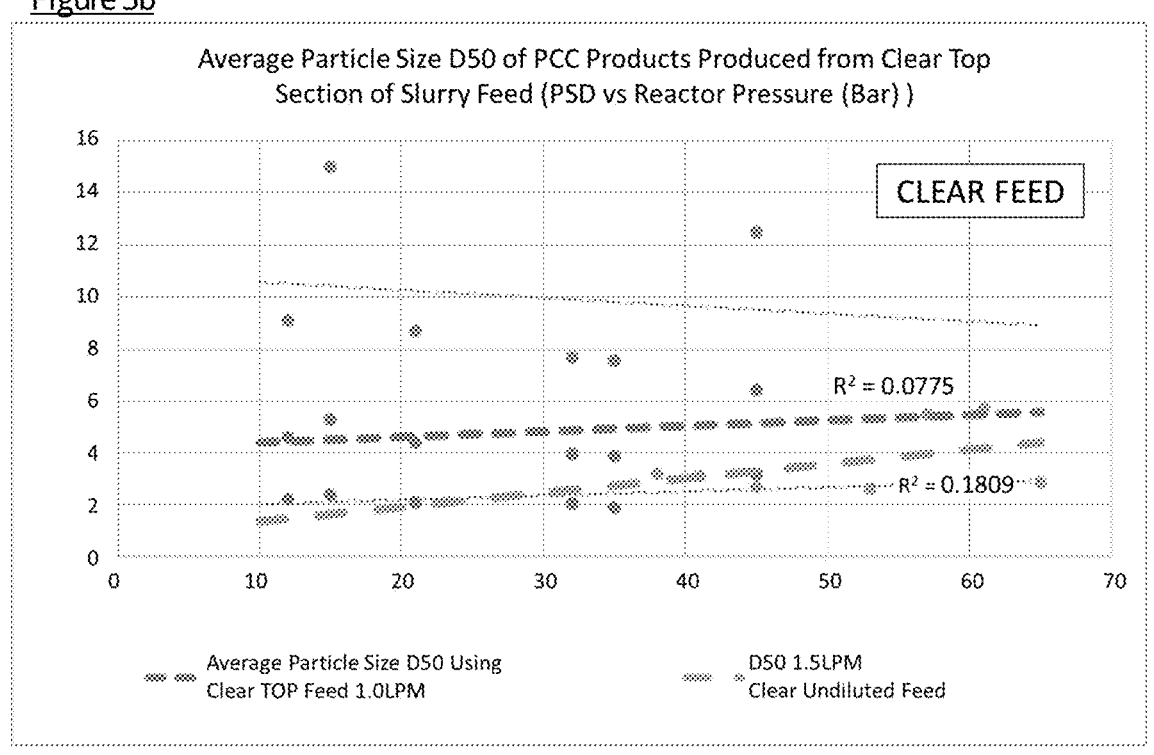
Figure 3C:
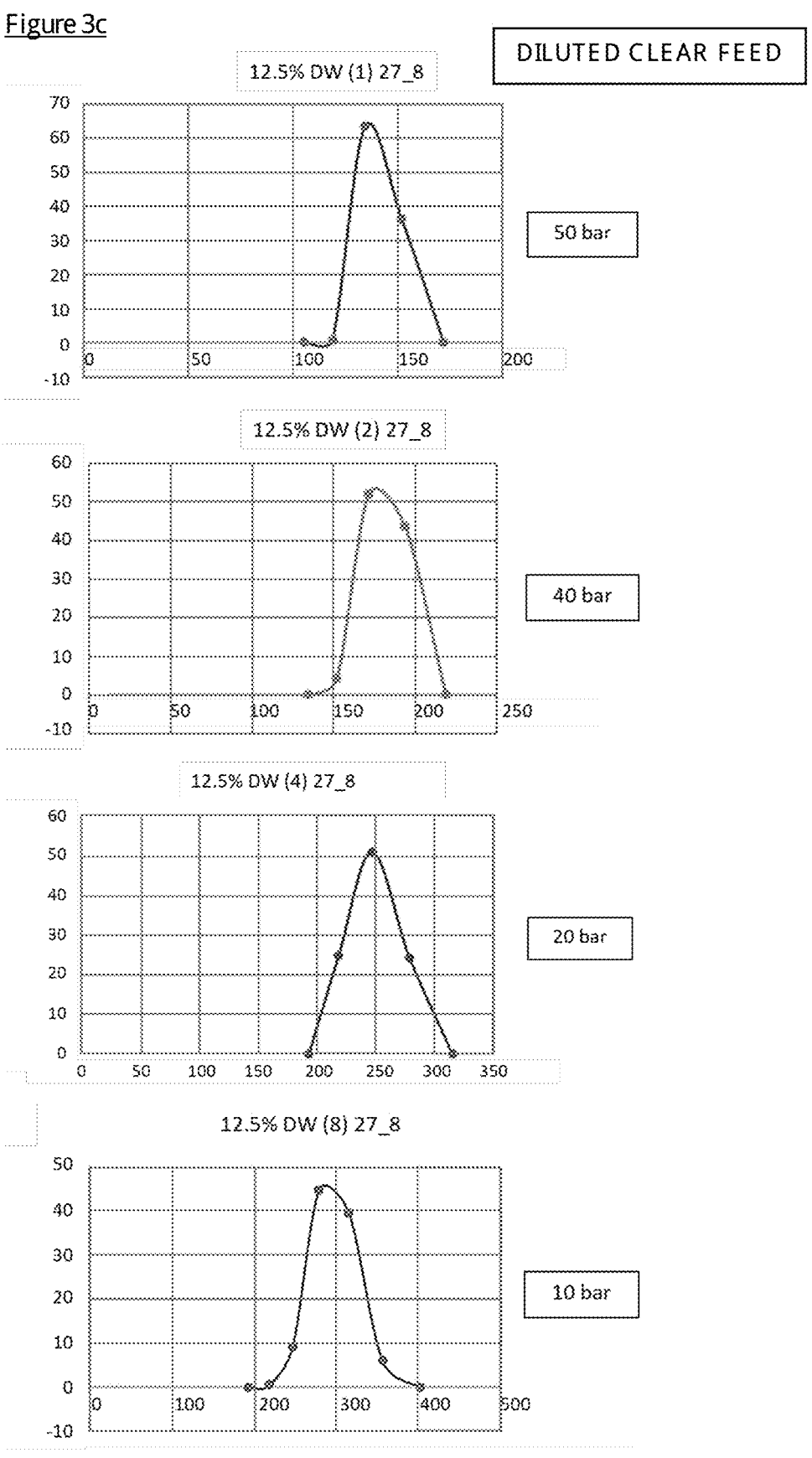

With regard to FIGS. 3a-c, the size distribution of the calcium carbonate particles produced from the carbonation reactor is illustrated, depending on the proportions of the original mixture (g CaO/L $H_2O$), the feed rate of the solution into the carbonation reactor (L per minute), and the solution selected. Retention time was reduced by increasing the pressure and using a nozzle which extended around 15 cm into the 42 cm reactor.

FIG. 3a indicates a particle size distribution of around 10-30 μm when the 'milk of lime' solution is injected into the carbonation reactor at a rate of around 0.5-1.2 L/min. The solution can be obtained from a lower outlet of the slaking reactor when a mixture of 7 g CaO per litre of water is stirred at low speeds, or alternatively at any outlet when the mixture is stirred at high speeds such that the solution within the slaking reactor is substantially homogenous. The resulting particles can be used in the polymer and sealant industries.

FIG. 3b illustrates a particle size distribution of around 2-10 μm when the 'clear top' solution is injected into the carbonation reactor at a rate of around 1-1.5 L/min. Particles of this size can be used in the food and cosmetics industries FIG. 3c shows that when the 'clear top' solution is diluted with water by up to 50%, typically 10-30% and injected into the carbonation reactor at a rate of around 1.5 L/min, the calcium carbonate is formed with a particle size distribution of around 300-600 nm. This is because crystalline growth is suppressed due to the limitation of secondary growth particles. These particles have applications in medicine, paper filler, and rubber glove manufacturing.

Thus it will be appreciated that a single system can be easily controlled to produce calcium carbonate particles of different sizes, depending on the relevant industry's requirements.

Figure 4:
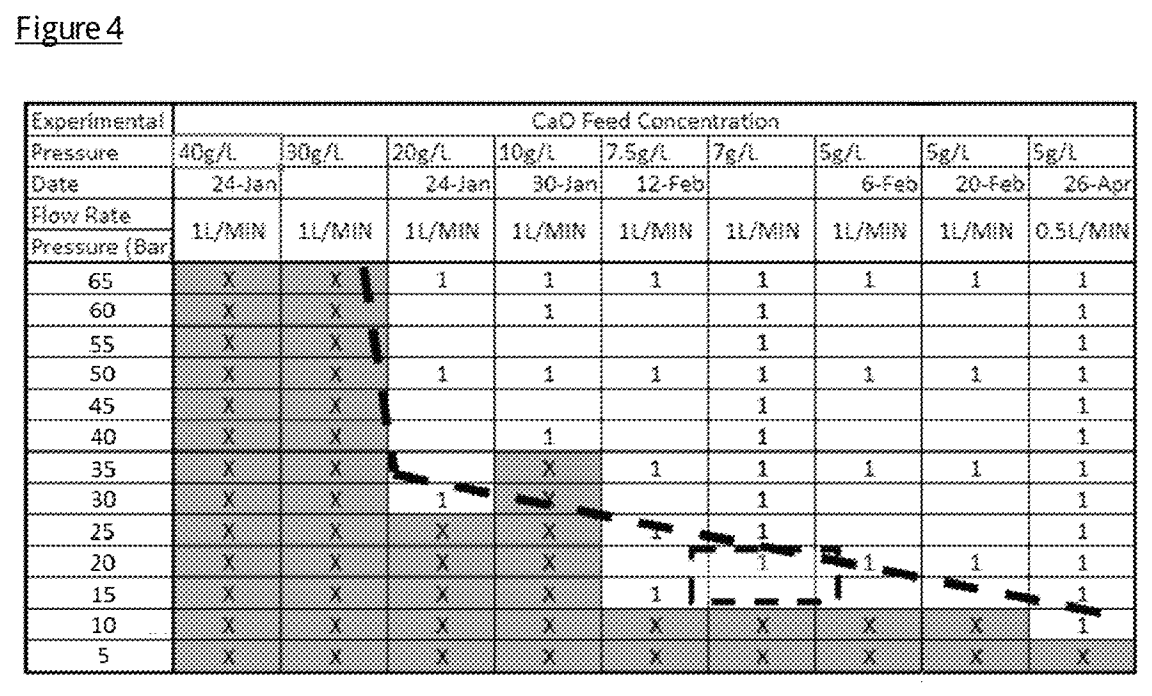

With regard to FIG. 4, there is illustrated an analysis of the slaking reaction under different conditions, by examining the calcium carbonate produced by the carbonation reactor. Phenolphtalein indicator is added to the feedstock which is then spray injected into the carbonation reactor at 1 L/min. If the purple colour of the phenolphthalein turns colourless than the reaction is complete i.e. no excess $Ca^{2+}$ in the product. In the plant economics, a low reactor working pressure (about 20 bar) is required with a high calcium oxide federate. The results show that a calcium oxide concentration of 7 g/L is recommended for a pressure of 20 bar.

It will be appreciated by persons skilled in the art that the present invention may also include further additional modifications made to the system which does not affect the overall functioning of the system.

The invention claimed is:

1. A method for making a calcium hydroxide solution comprising the steps of:
  adding water and calcium oxide to a slaking reactor comprising a stirring means at an upper end thereof, and two or more outlets provided at different vertical positions of the slaking reactor;
  stirring the water and the calcium oxide such that a concentration gradient of calcium ions is formed within the slaking reactor; and
  selecting an outlet from the two or more outlets to collect the calcium hydroxide solution depending on a concentration of calcium ions required.

2. The method according to claim 1 wherein the speed of the stirring means is selectively controlled from 100 rpm to 1000 rpm.

3. The method according to claim 1 further comprising spraying the calcium hydroxide solution into a carbonation reactor containing supercritical carbon dioxide to form a slurry of calcium carbonate.

4. The method according to claim 3 wherein the water and the calcium oxide are stirred slowly to provide a 'clear top' solution at an upper outlet of the slaking reactor, such that when the 'clear top' solution is collected as the calcium hydroxide solution and sprayed into the carbonation reactor:
  a. without dilution, calcium carbonate is formed with a particle size of around 2-10 μm; or
  b. with dilution by 10-30% by volume of the calcium hydroxide solution with water, calcium carbonate is formed with a particle size of around 300-600 nm.

5. The method according to claim 3 wherein the water and the calcium oxide are stirred slowly to provide a 'milk of lime' solution at a lower outlet, such that when sprayed into the carbonation reactor, calcium carbonate is formed with a particle size of around 10-30 μm.

6. The method according to claim 3 wherein the calcium hydroxide solution is provided to the carbonation reactor continuously at a flow rate of 0.5-1.5 L/min.

7. The method according to claim 3 wherein the calcium hydroxide solution is sprayed using an injector nozzle provided at a top section of the carbonation reactor, having a working pressure of around 80-400 bar.

8. The method according to claim 7 wherein the injector nozzle extends around 30-40% into the carbonation reactor.

* * * * *